(12) United States Patent
Lee et al.

(10) Patent No.: US 9,442,613 B2
(45) Date of Patent: Sep. 13, 2016

(54) TOUCH WINDOW

(71) Applicant: LG INNOTEK CO., LTD., Seoul (KR)

(72) Inventors: Jung Ki Lee, Seoul (KR); Jun Lee, Seoul (KR); Beom Sun Hong, Seoul (KR); Jung Hwan Bang, Seoul (KR); Jun Phill Eom, Seoul (KR); Chan Kyu Koo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/330,645

(22) Filed: Jul. 14, 2014

(65) Prior Publication Data

US 2015/0015810 A1    Jan. 15, 2015

(30) Foreign Application Priority Data

Jul. 12, 2013 (KR) .................. 10-2013-0082067
Aug. 27, 2013 (KR) .................. 10-2013-0101608

(51) Int. Cl.
*G06F 3/041*   (2006.01)
*G09G 1/08*    (2006.01)
*G06F 3/044*   (2006.01)

(52) U.S. Cl.
CPC ..... *G06F 3/044* (2013.01); *G06F 2203/04103* (2013.01); *G06F 2203/04112* (2013.01)

(58) Field of Classification Search
CPC ................ G06F 2203/04103; G06F 3/044; G06F 2203/04112
See application file for complete search history.

(56) References Cited

U.S. PATENT DOCUMENTS

| | | | |
|---|---|---|---|
| 2009/0078673 A1 | 3/2009 | Kihara et al. | |
| 2010/0141598 A1* | 6/2010 | Yamauchi | G06F 3/045 345/173 |
| 2010/0225606 A1* | 9/2010 | Sasaki | G02F 1/13338 345/173 |
| 2011/0069033 A1* | 3/2011 | Meng | G06F 3/044 345/174 |
| 2013/0044078 A1* | 2/2013 | Hallenberg | G06F 3/039 345/174 |
| 2013/0161070 A1* | 6/2013 | Lee | H05K 3/105 174/250 |

FOREIGN PATENT DOCUMENTS

| | | |
|---|---|---|
| KR | 10-2008-0028035 A | 3/2008 |
| KR | 10-2009-0031978 A | 3/2009 |
| KR | 10-2009-0049141 A | 5/2009 |

* cited by examiner

*Primary Examiner* — Charles Hicks
(74) *Attorney, Agent, or Firm* — Saliwanchik, Lloyd & Eisenschenk (57) ABSTRACT

A touch window includes a substrate, and an electrode part provided on the substrate. The electrode part includes a first sub-pattern, an electrode layer provided in the first sub-pattern, a second sub-pattern adjacent to the first sub-pattern, and a third sub-pattern provided on a top surface of the first sub-pattern.

17 Claims, 10 Drawing Sheets

TOUCH WINDOW

CROSS-REFERENCES TO RELATED APPLICATIONS

This application claims the benefit under 35 U.S.C. §119 of Korean Patent Application Nos. 10-2013-0082067, filed on Jul. 12, 2013 and 10-2013-0101608, filed on Aug. 27, 2013, which are hereby incorporated by reference in their entirety.

BACKGROUND

Technical Field

The present disclosure relates to a touch window.

Recently, a touch panel, which performs an input function through the touch of an image displayed on a touch device by an input device such as a stylus pen or a hand, has been applied to various electronic appliances.

The touch panel may be mainly classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance between electrodes when a finger of the user is touched on the capacitive touch panel. When taking into consideration the convenience of a fabrication scheme and a sensing power, the capacitive touch panel has been spotlighted in a smaller model touch panel recently.

Indium tin oxide (ITO), which is most widely used material for the transparent electrode of the touch panel, is highly priced and easy to be physically damaged when the substrate is flexed and bent, so that the electrode property is deteriorated. Therefore, the indium tin oxide (ITO) is not suitable for a flexible device. In addition, when the ITO is applied to a large-size touch panel, problems may be caused by high resistance.

In order to solve the problem, researches and studies on an alternative electrode part have been actively carried out. The substitute for ITO is formed by making the shape of the mesh using metallic materials. The mesh is formed using a nano pattern and a micro-pattern, and the difference in height between nano-patterns and micro-patterns causes collision or scratch between a mold and the micro-patterns during a demolding process after an imprinting process is performed by using the mold. Accordingly, the micro-pattern is damaged, causing bad influence upon a metallic layer formed on the micro-pattern.

In addition, when an additional layer is laminated, since the height of the micro-pattern is higher than the height of the nano-pattern, the metallic layer formed on the micro-pattern may be delaminated in the lamination direction.

BRIEF SUMMARY

The embodiment provides a touch window having improved reliability.

According to the embodiment, there is provided a touch window including a substrate, and an electrode part on the substrate. The electrode part includes a first sub-pattern, an electrode layer provided in the first sub-pattern, a second sub-pattern adjacent to the first sub-pattern, and a third sub-pattern on a top surface of the first sub-pattern.

According to another embodiment, there is provided a touch window including a substrate, and an electrode part provided on the substrate and including a conductive pattern. The electrode part includes a first sub-pattern, an electrode layer on the first sub-pattern, and a second sub-pattern adjacent to the first sub-pattern. The first sub-pattern has a height equal to or lower than a height of the second sub-pattern.

As described above, the electrode part of the touch window according to the embodiment has a mesh structure including a first sub-pattern, a second sub-pattern, and a third-sub pattern, and the adhesive strength between the third sub-pattern and the electrode layer can be improved due to various shapes of third sub-patterns. In other words, the electrode layer can be prevented from being delaminated.

Meanwhile, the height of the first sub-pattern may be lower than the height of the second sub-pattern. In addition, the height of the first sub-pattern may be equal to the height of the second sub-pattern.

Therefore, when an imprinting process is performed by using a mold in order to fabricate the first and second sub-patterns, the first sub-pattern can be prevented from colliding with the mold and being scratched by the mold in the demolding process. Therefore, the damage of the first sub-pattern can be prevented, and the electrode layer formed on the first sub-pattern can be formed without the damage.

Meanwhile, the top surface of the electrode layer may be provided lower than the top surface of the second sub-pattern. In addition, the top surface of the electrode layer may have the same height as that of the top surface of the second sub-pattern. Accordingly, when an additional layer is formed on the electrode layer on the subsequent process, the electrode layer can be prevented from being delaminated. For example, when an optical clear adhesive (OCA) layer is laminated on the electrode layer, the electrode layer can be prevented from being pushed in the lamination direction and delaminated.

DETAILED DESCRIPTION

In the description of the embodiments, it will be understood that, when each layer (film), region, pattern or structure is referred to as being "on" or "under" another layer (film), another region, another pad or another pattern, it can be "directly" or "indirectly" on the other layer (film), region, pad, or pattern, or one or more intervening layers may also be present. Such a position of the layer has been described with reference to the drawings.

The thickness and size of each layer (film), region, pattern or structure shown in the drawings may be modified for the purpose of convenience or clarity. In addition, the size of elements does not utterly reflect an actual size.

Hereinafter, the embodiment will be described in detail with reference to accompanying drawings.

Figure 1:
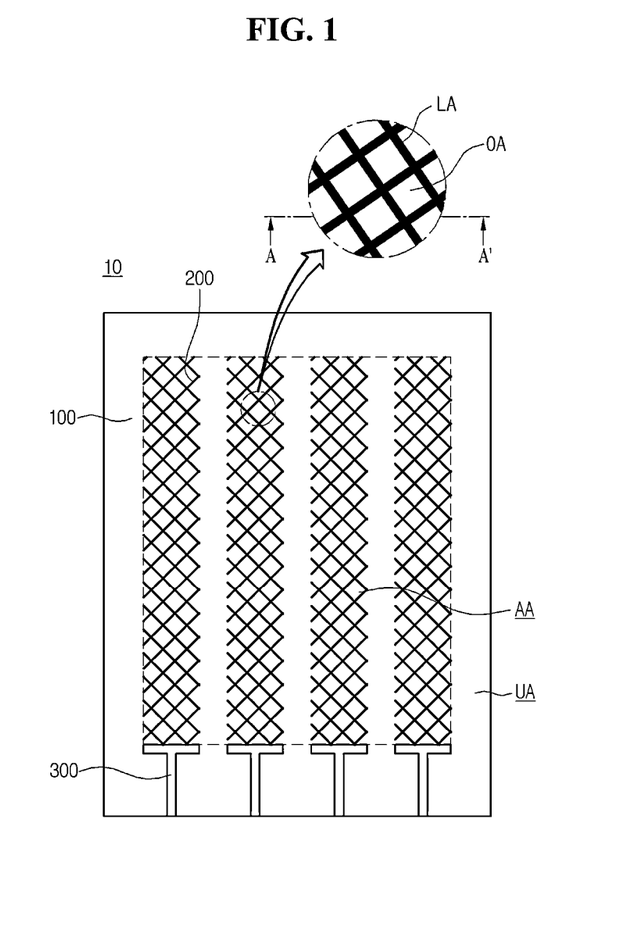
FIG. 1 is a plan view showing a touch window according to one embodiment.
Figure 2:
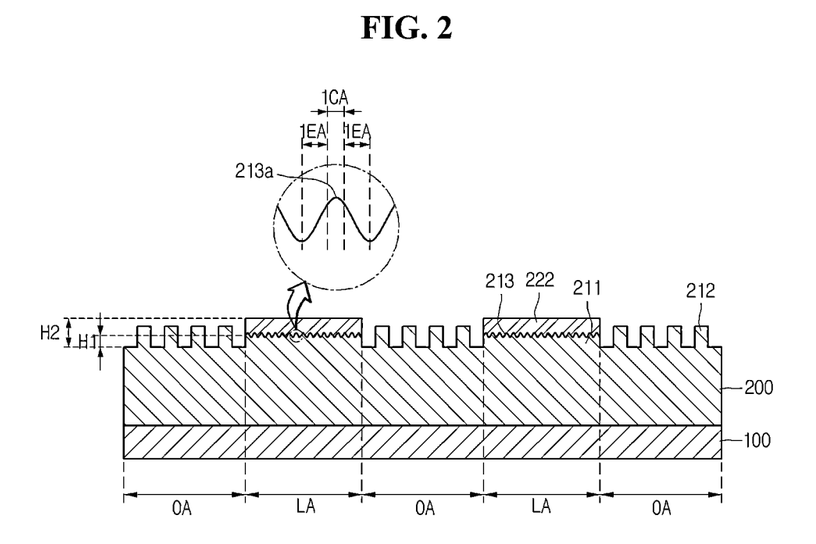
FIG. 2 is a sectional view taken along line A-A' of FIG. 1.

Hereinafter, the touch window according to the embodiment will be described in detail with reference to FIGS. 1 to 9. FIG. 1 is a plan view showing a touch window according to one embodiment. FIG. 2 is a sectional view taken along line A-A' of FIG. 1. FIGS. 3 to 9 are sectional views showing the touch window according to another embodiment.

Referring to FIG. 1, a touch window 10 according to a first embodiment includes a substrate 100 having an active area AA, in which a position of an input device (e.g., finger) is detected, and an unactive area UA provided at a peripheral portion of the active area AA.

In this case, electrode parts 200 may be formed in the active area AA such that the input device may be sensed. Wires 300 electrically connecting the electrode parts 200 to each other may be formed in the unactive area UA. In addition, an external circuit connected to the wires 300 may be placed in the unactive area UA.

If the input device such as the finger touches the touch panel, the variation of capacitance occurs in the touched part by the input device, and the touched part subject to the variation of the capacitance may be detected as a touch point.

Hereinafter, the touch window will be described in more detail.

The substrate 100 may include various materials to support the electrode parts 200, the wires 300, and a circuit board formed on the substrate 100. For instance, the substrate 100 may include a glass substrate or a plastic substrate.

An outer dummy layer is formed in the unactive area UA of the substrate 100. The outer dummy layer may be coated with a material having a predetermined color so that the wires 300 and a printed circuit board connecting the wires 300 to external circuits cannot be seen from the outside. The outer dummy layer may have a color suitable for a desired outer appearance thereof. For example, the outer dummy layer includes black pigments to represent a black color. In addition, a desired logo may be formed in the outer dummy layer through various schemes. The outer dummy layer may be formed through a deposition, print, or wet coating scheme.

The electrode part 200 may be formed on the substrate 100. The electrode part 200 may detect whether the input device such as the finger is touched. FIG. 1 shows the electrode part 200 extending in one direction on the substrate 100, but the embodiment is not limited thereto. Accordingly, the electrode part 200 may extend in a direction crossing the one direction. In addition, the electrode part 200 may two types of electrode parts having a shape extending in the one direction and a shape extending in another direction.

Meanwhile, the electrode parts 200 may include a conductive pattern. In other words, the electrode parts 200 may have a mesh structure. In this case, the mesh structure may be randomly formed so that a moiré phenomenon can be prevented. The moiré phenomenon occurs when periodical stripes overlap with each other. Since adjacent strips overlap with each other, a thickness of a strip is thickened so that the strip is spotlighted as compared with other stripes. Thus, in order to prevent such a moiré phenomenon, the mesh structure may be variously arranged.

In detail, the electrode part 200 includes a mesh opening part OA and a mesh line part LA. In this case, a line width of the mesh line part LA may be in the range of 0.1 µm to 10 µm. A mesh line part LA of 0.1 µm or less may be impossible due to the characteristic of the manufacturing process. If the line width is 10 µm or less, the pattern of the electrode part 200 may not be viewed. Preferably, the line width of the mesh line part LA may be in the range of 1 µm to 5 µm.

Meanwhile, as shown in FIG. 1, the mesh opening part OA may have the shape of a rectangle, but the embodiment is not limited thereto. The mesh opening part OA may have various shapes such as a polygonal shape including a diamond shape, a pentagonal shape, or a hexagonal shape, or a circular shape.

As the electrode part 200 has the shape of the mesh, the pattern of the electrode part 200 may not be viewed in the active area AA. In other words, even when the electrode part 200 includes metal, the pattern may not be viewed. In addition, even when the electrode part 200 is applied to a large-size touch window, the resistance of the touch window can be reduced. Further, when the electrode part 200 is formed through the printing process, the printing quality can be improved so that the high-quality touch window can be ensured.

Referring to FIG. 2, the electrode part 200 may include a first sub-pattern 211, a second sub-pattern 212, a third sub-pattern 213, and an electrode layer 222.

The first sub-pattern 211 is provided on the substrate 100. The first sub-pattern 211 is provided in the mesh line part LA. Accordingly, the first sub-pattern 211 is provided in the shape of a mesh. The first sub-pattern 211 may be an embossed pattern.

The second sub-pattern 212 is provided on the substrate 100. The second sub-pattern 212 is provided in the mesh opening part OA. Accordingly, the second sub-pattern 212 may be interposed between first sub-patterns 211. The second sub-pattern 212 may be an embossed pattern.

The first and second sub-patterns 211 and 212 may include resin or polymer.

In this case, a height H1 of the first sub-pattern 211 may be lower than a height H2 of the second sub-pattern 212. In addition, the height H1 of the first sub-pattern 211 may be equal to the height H2 of the second sub-pattern 212.

Therefore, when an imprinting process is performed by using a mold in order to fabricate the first and second sub-patterns 211 and 212, the first sub-pattern can be prevented from colliding with the mold and being scratched by the mold in the demolding process. Therefore, the damage of the first sub-pattern can be prevented, and the electrode layer formed on the first sub-pattern can be formed without the damage thereof.

A third sub-pattern 213 is additionally provided on the top surface of the first sub-pattern 211. The third sub-pattern 213 may include a fine pattern. For example, the third sub-pattern 213 may include a plurality of protrusions.

The third sub-pattern 213 includes a first central part 1CA and first outer portions 1EA provided outside the first central part 1CA. The third sub-pattern 213 includes the highest mountain 213a. In this case, the mountain 213a may be provided in the first central part 1CA. In other words, the highest portion of the third sub-pattern 213 may be provided in the central part 1CA.

The electrode layer 222 may be provided on the third sub-pattern 213. The adhesion strength between the electrode layer 222 and the first sub-pattern 211 can be improved through the third sub-pattern 213. Therefore, the third sub-pattern 213 can prevent the electrode layer 222 from being delaminated.

The third sub-pattern 213 may include the same material as that of the first sub-pattern 211. In other words, the third sub-pattern 213 may include resin, but the embodiment is not limited thereto. In other words, the third sub-pattern 213 may include various materials sufficient to improve the adhesion strength.

The electrode layer 222 is provided on the first sub-pattern 211. In detail, the electrode layer 222 is provided on the third sub-pattern 213. Therefore, the electrode layer 222 is provided in the mesh line part LA, and is provided in the shape of a mesh. The electrode layer 222 may include various metals to represent superior electrical conductivity. For example, the electrode layer 222 may include Cu, Au, Ag, Al, Ti, Ni, or the alloy thereof.

Therefore, the wire 300 is formed in the unactive area UA. The wire 300 may include a material the same as or similar to that of the electrode layer 222. The wire 300 may apply an electrical signal to the electrode part 200. The wire 300 is formed in the unactive area UA, so that the wire 300 is not viewed.

Meanwhile, although not shown, a circuit board connected with the wire may be further located. Various shapes of printed circuit board may be applied to the circuit board. For example, a flexible printed circuit board (FPCB) may be applied to the circuit board.

Hereinafter, a touch window according to another embodiment will be described in detail with reference to FIG. 3. For clear and simple explanation, structures and components the same as or similar to those described above will not further described.

Figure 3:
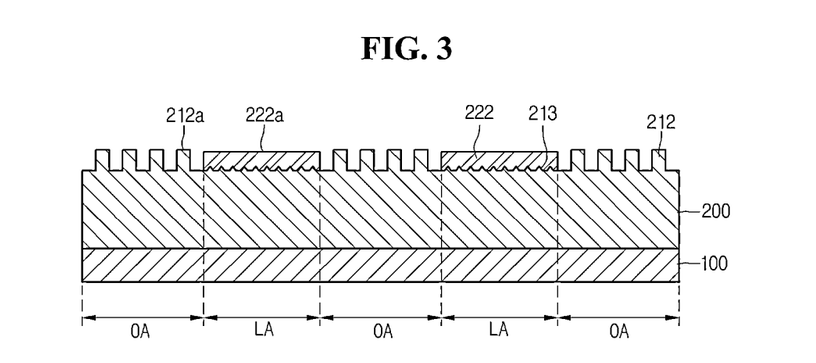
FIGS. 3 to 9 are sectional views showing the touch window according to another embodiment.

Referring to FIG. 3, the first sub-pattern 211 may have no height. In other words, the structure of the touch window shown in FIG. 3 has no first sub-pattern provided in the touch window shown in FIG. 2. Accordingly, the third sub-pattern 213 may be interposed between the second sub-patterns 212, and the electrode layer 222 may be formed on the third sub-pattern 213.

In this case, a top surface 222a of the electrode layer 222 is located lower than a top surface 212a of the second sub-pattern 212. In addition, the top surface 222a of the electrode layer 222 may have the height the same as the top surface 212a of the second sub-pattern 212.

Accordingly, when an additional layer is formed on the electrode layer 222, the electrode layer 222 can be prevented from being delaminated. For example, when an optical clear adhesive (OCA) layer is laminated on the electrode 222, the electrode layer 222 can be prevented from being pushed in the lamination direction and delaminated.

Figure 4:
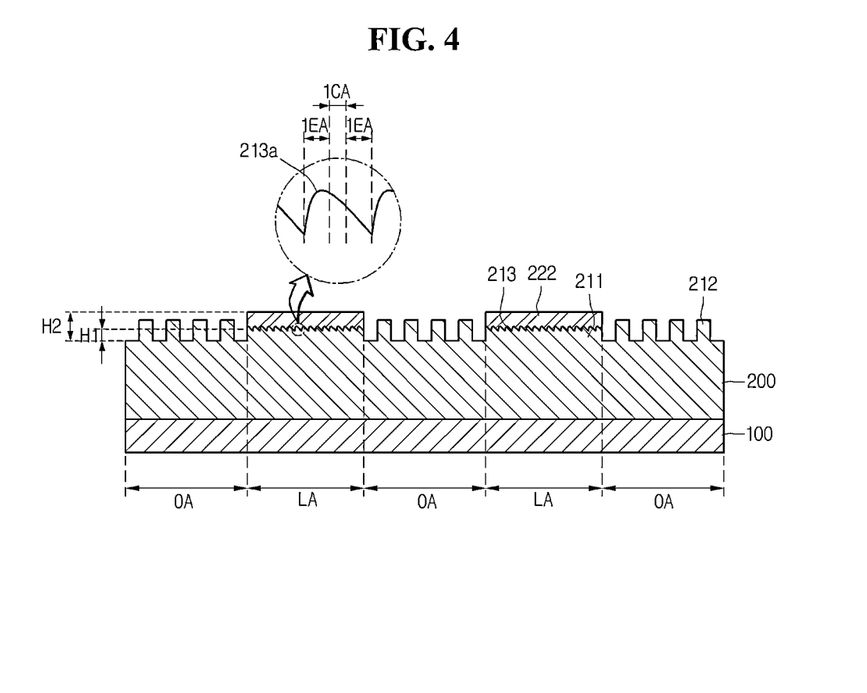

Referring to FIG. 4, a mountain 213a of the third sub-pattern 213 of the touch window according to another embodiment may be provided only in the first outer part 1EA. In detail, the mountain 213a may be provided only at any one of the first outer parts 1EA. Therefore, the sectional surface of the third sub-pattern 213 may have an asymmetric structure.

Figure 5:
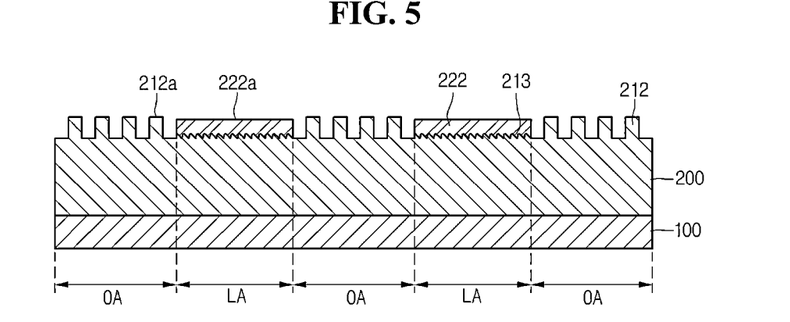

Referring to FIG. 5, the first sub-pattern 211 may have no height. In other words, the structure of the touch window shown in FIG. 4 has no first sub-pattern 211 in the touch window shown in FIG. 4. Accordingly, the third sub-pattern 213 is provided between the second sub-patterns 212, and the electrode layer 222 may be formed on the third sub-pattern 213.

The top surface 222a of the electrode layer 222 is located lower than the top surface 212a of the second sub-pattern 212. In addition, the top surface 222a of the electrode layer 222 may have the same height as that of the top surface 212a of the second sub-pattern 212.

A mountain 213a of the third sub-pattern 213 may be provided only in the first outer part 1EA. In detail, the mountain 213a may be provided only at one outer portion of the first outer part 1EA. Therefore, the sectional surface of the third sub-pattern 213 may have an asymmetric structure.

Figure 6:
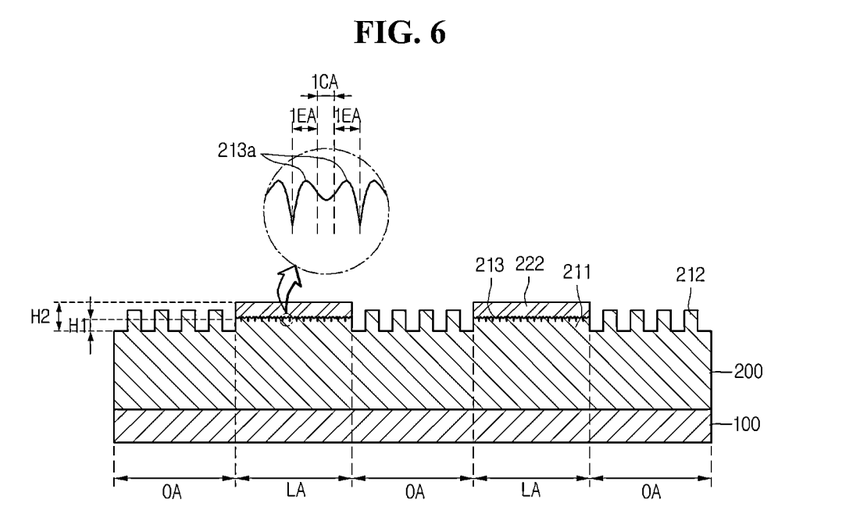

Referring to FIG. 6, the mountain 213a of the third sub-pattern 213 may be provided in the first outer part 1EA. In detail, the mountain 213a may be provided only in the first outer part 1EA. Therefore, the mountain 213a may be provided at both sides of the first central part 1CA. In other words, the mountain 213a may have a symmetric structure about the first central part 1CA.

Figure 7:
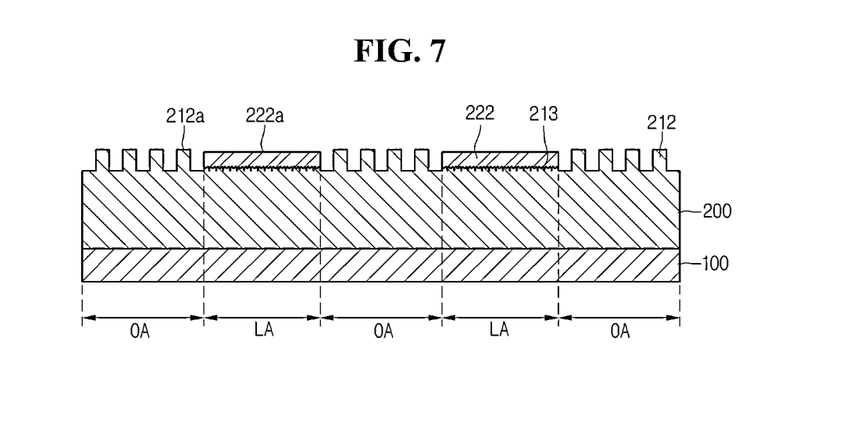

Referring to FIG. 7, the first sub-pattern 211 may have no height. In other words, the structure of the touch window shown in FIG. 6 has no first sub-pattern 211 provided in the touch window shown in FIG. 6. Accordingly, the third sub-pattern 213 may be interposed between the second sub-patterns 212, and the electrode layer 222 may be formed on the third sub-pattern 213.

In this case, the mountain 213a of the third sub-pattern 213 may be provided only in the first outer part 1EA. In detail, the mountain 213a may be provided only at any one of the first outer parts 1EA. Accordingly, the mountains 213a may be provided at both sides of the first central part 1CA. In other words, the mountain 213a may have a symmetric structure about the first central part 1CA.

According to the embodiment, various shapes of the third sub-pattern 213 can improve the adhesion strength with the electrode layer 222 and can prevent the electrode layer 222 from being delaminated.

Figure 8:
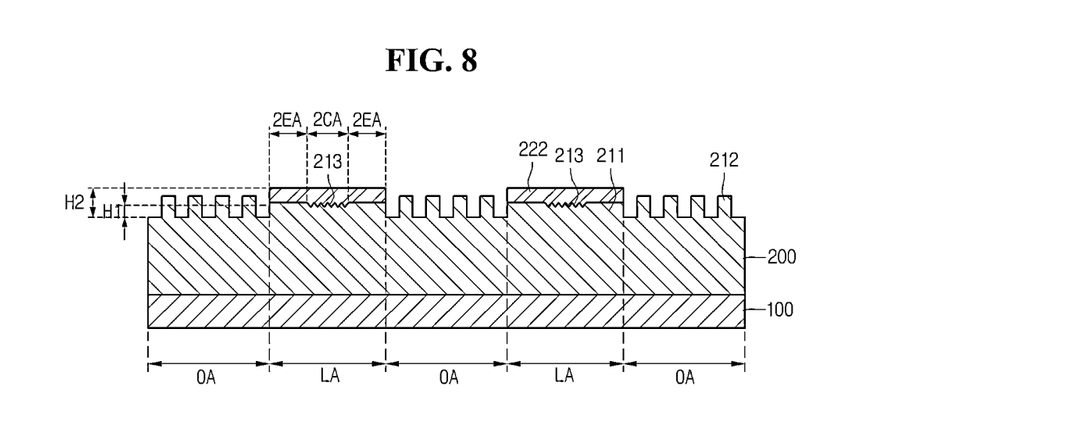

Referring to FIG. 8, the first sub-pattern 211 includes a second central part 2CA and second outer parts 2EA provided outside the second central part 2CA. In this case, the third sub-pattern 213 may be provided only at the second central part 2CA. In other words, the third sub-pattern 213 may be located only at the center of the first sub-pattern 211.

Figure 9:
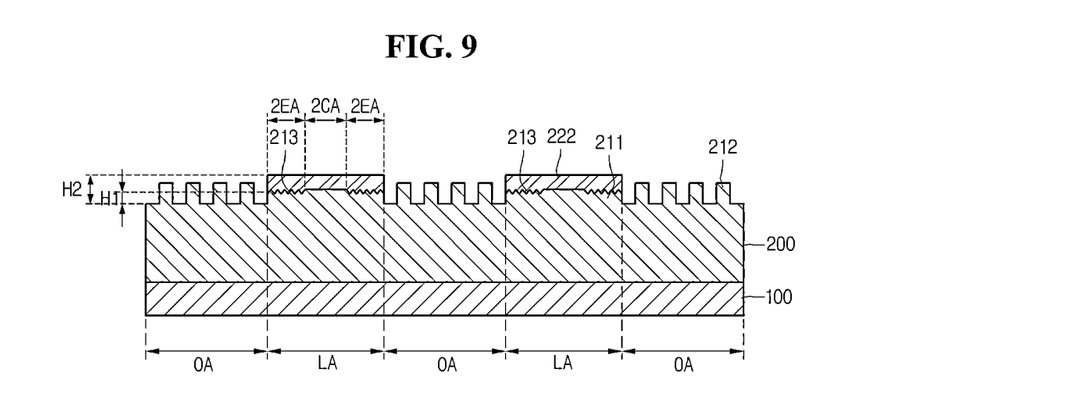

Referring to FIG. 9, the third sub-pattern 213 may be provided only at the second outer part 2EA. In other words, the third sub-pattern 213 may be provided only at the outer portion of the first sub-pattern 211.

Hereinafter, a method of fabricating the touch window according to the embodiment will be described with reference to FIGS. 10 to 13. FIGS. 5 to 10 are sectional views to explain the method of fabricating the touch window according to the embodiment.

Figure 10:
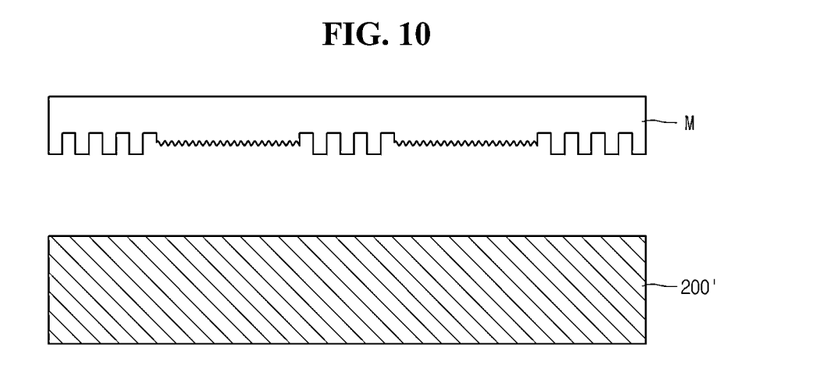
FIGS. 10 to 13 are sectional views to explain a method of fabricating the touch window according to the embodiment.

First, referring to FIG. 10, a mold M having a pattern to be formed may be located on a resin layer 200'

Figure 11:
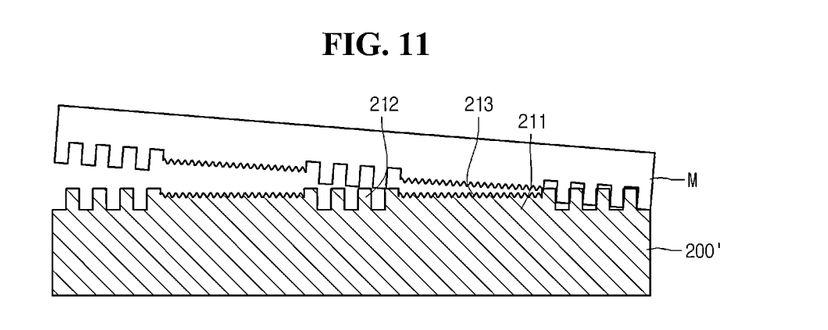

Referring to FIG. 11, the mold M may be imprinted on the resin layer 200'. The first and second sub-patterns 211 and 212 may be fabricated through the imprinting process. In this case, a height H1 of the first sub-pattern 211 may be lower than a height H2 of the second sub-pattern 212. Accordingly, when the mold M is demolded, the mold M may collide with a portion of the first sub-pattern 211 or may scratch the portion of the first sub-pattern 211.

Figure 12:
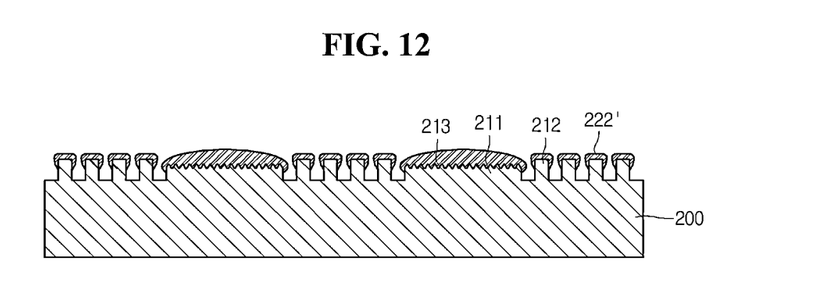

Thereafter, referring to FIG. 12, an electrode material 222' may be formed on the first and second sub-patterns 211 and 212. The electrode material 222' may be provided through a deposition scheme or a plating scheme.

Figure 13:
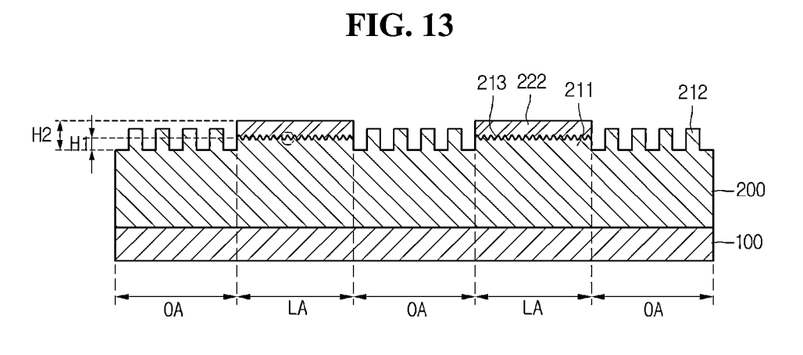

Referring to FIG. 13, the electrode material 222' may be etched. In this case, the difference in the etching areas is made depending on the difference between the structure of the first sub-pattern 211 and the structure of the second sub-pattern 212 and the difference in the contact area with the electrode materials 222' between the first sub-pattern 211 and the second sub-pattern 212. In other words, since the contact area between the first sub-pattern 211 and the electrode material 222' is greater than the contact area between the second sub-pattern 212 and the electrode material 222', the electrode material 222' formed on the first sub-pattern 211 may be less etched. In other words, at the same etching rate, the electrode materials 222' formed on the first sub-pattern 211 remains, and the electrode material 222' formed on the second sub-pattern 212 is etched and removed. Therefore, the electrode layer 222 may be formed only on the first sub-pattern 211, and the electrode layer 222 may be provided in the shape of a mesh.

Figure 14:
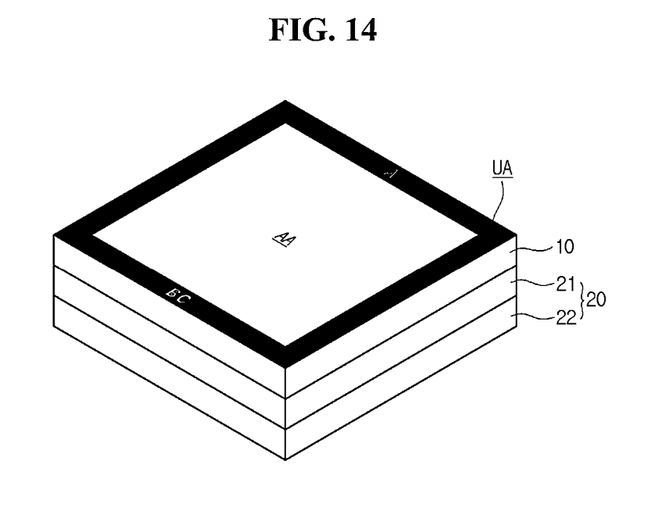
FIG. 14 is a perspective view showing a touch device having a display panel in which the touch window according to the embodiment is provided.

Meanwhile, referring to FIG. 14, the touch window 10 may be provided on the display panel 20 serving as a driving unit. The touch window 10 and the display panel 20 are combined to each other to constitute the touch device.

The display panel 20 has a display area in which an image is output. The display panel applied to the touch device may typically include upper and lower substrates 21 and 22. The lower substrate 22 may have data lines, gate lines, and thin film transistor TFTs formed therein. The upper substrate 21 is bonded to the lower substrate 22 to protect components provided on the lower substrate 22.

The display panel 20 may have various types of display panels depending on the type of the touch device according to the embodiment. In other words, the touch device according to the embodiment may include a liquid crystal display (LCD), a field emission display, a plasma display panel (PDP), an organic light emitting diode (OLED), and an electrophoresis display (EPD). Accordingly, various types of display panels 20 may be configured.

The touch window is applied to not only a mobile terminal, but also to a vehicle, so that the touch window may be applied to a personal navigation display of a navigation system. In addition, the touch window is applied a dashboard to realize a center information display (CID), but the embodiment is not limited thereto. The touch window may be used for various electronic products.

Figure 15:
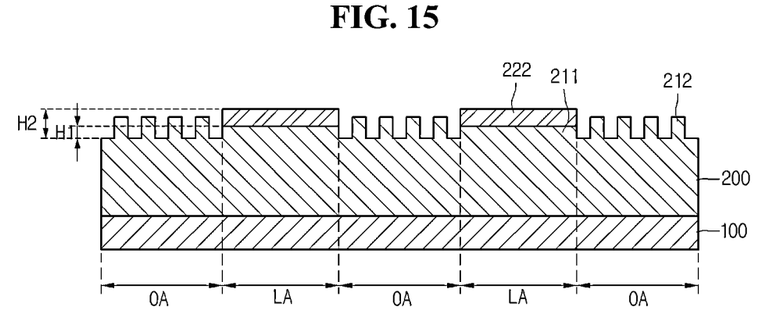
FIGS. 15 to 17 are sectional views showing a touch window according to another embodiment.

Meanwhile, referring to FIG. 15, in a touch window according to another embodiment, the height H1 of the first sub-pattern 211 may be lower than the height H of the second sub-pattern 212. In addition, the height H1 of the first sub-pattern 211 may be equal to the height H2 of the second sub-pattern 212.

Therefore, when an imprinting process is performed by using a mold in order to fabricate the first and second sub-patterns 211 and 212, the first sub-pattern can be prevented from colliding with the mold and being scratched by the mold in the demolding process. Therefore, the damage of the first sub-pattern can be prevented, and the electrode layer formed on the first sub-pattern can be formed without the damage thereof.

The electrode layer 222 is provided on the first sub-pattern 211. The electrode layer 222 is provided in the mesh line part LA, and the electrode layer 222 is provided in the shape of a mesh. The electrode layer 222 may include various metals representing superior electrical conductivity. For example, the electrode layer 222 may include Cu, Au, Ag, Al, Ti, Ni, and the alloy thereof.

Figure 16:
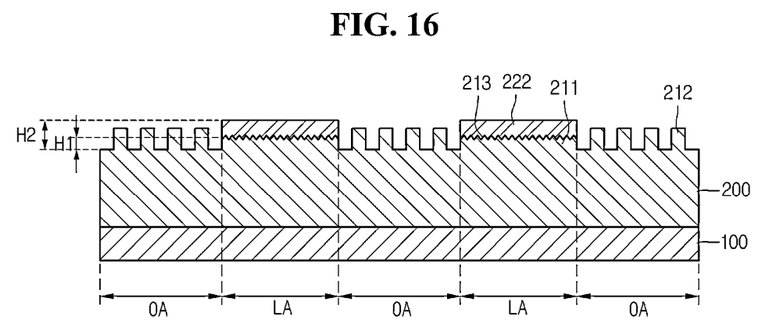

Meanwhile, referring to FIG. 16, in the touch window according to another embodiment, the third sub-pattern 213 may be further provided on the top surface of the first sub-pattern 211. The third sub-pattern 213 may include a fine pattern. For example, the third sub-pattern 213 may include a plurality of protrusions.

The electrode layer 222 may be provided on the third sub-pattern 213. The adhesion strength between the electrode layer 222 and the first sub-pattern 211 can be improved through the third sub-pattern 213. Therefore, the third sub-pattern 213 can prevent the electrode layer 222 from being delaminated.

The third sub-pattern 213 may include the same material as that constituting the first sub-pattern 211. In other words, the third sub-pattern 213 may include resin, but the embodiment is not limited thereto. The third sub-pattern 213 may include various materials to improve the adhesive strength.

Figure 17:
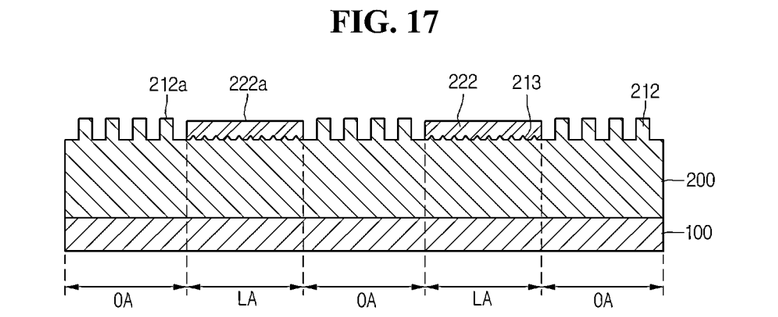

Meanwhile, referring to FIG. 17, in the touch window according to another embodiment, the structure of the touch window shown in FIG. 17 has no first sub-pattern (211 of FIG. 16) provided in the touch window shown in FIG. 16. In other words, in the touch window according to another embodiment, the third sub-pattern 213 may be interposed between the second sub-patterns 212, and the electrode layer 222 may be formed on the third sub-pattern 213.

In this case, the top surface 222a of the electrode layer 222 is located lower than the top surface 212a of the second sub-pattern 212. In addition, the top surface 222a of the electrode layer 222 may have the height the same as the top surface 212a of the second sub-pattern 212.

Accordingly, when an additional layer is formed on the electrode layer 222, the electrode layer 222 can be prevented from being delaminated. For example, when an optical clear adhesive (OCA) layer is laminated on the electrode 222, the electrode layer 222 can be prevented from being pushed in the lamination direction and delaminated.

Hereinafter, a method of fabricating the touch window according to the embodiment will be described with reference to FIGS. 18 to 23.

Figure 18:
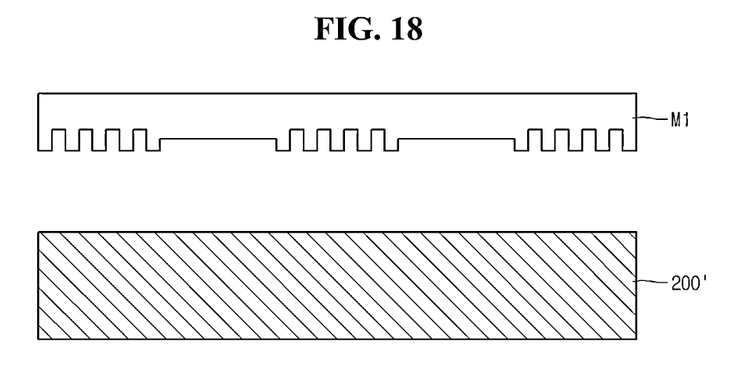
FIGS. 18 to 23 are sectional views to explain a method of fabricating the touch window according to another embodiment.

Referring to FIG. 18, a mold M1 having a pattern to be formed may be located on the resin layer 200'.

Figure 19:
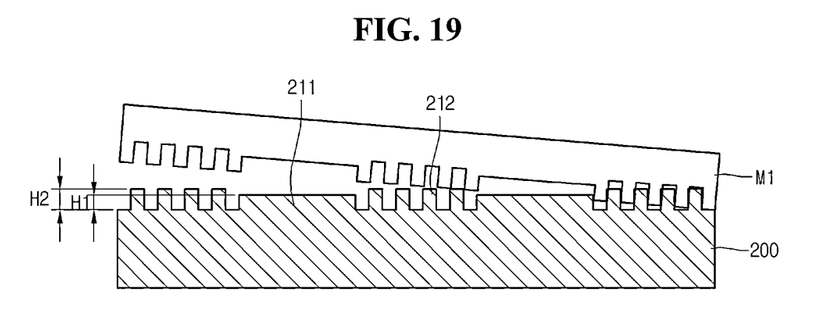

Referring to FIG. 19, the mold M1 may be imprinted on the resin layer 200'. The first and second sub-patterns 211 and 212 may be fabricated through the imprinting process. In this case, a height H1 of the first sub-pattern 211 may be lower than a height H2 of the second sub-pattern 212. Accordingly, when the mold M1 is demolded, the mold M1 may collide with a portion of the first sub-pattern 211 or may scratch the portion of the first sub-pattern 211.

Figure 20:
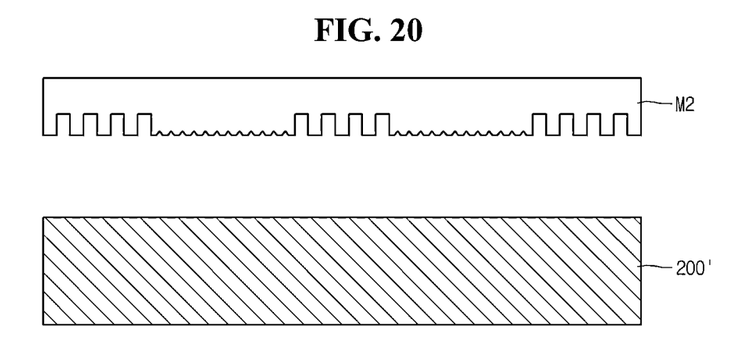
Figure 21:
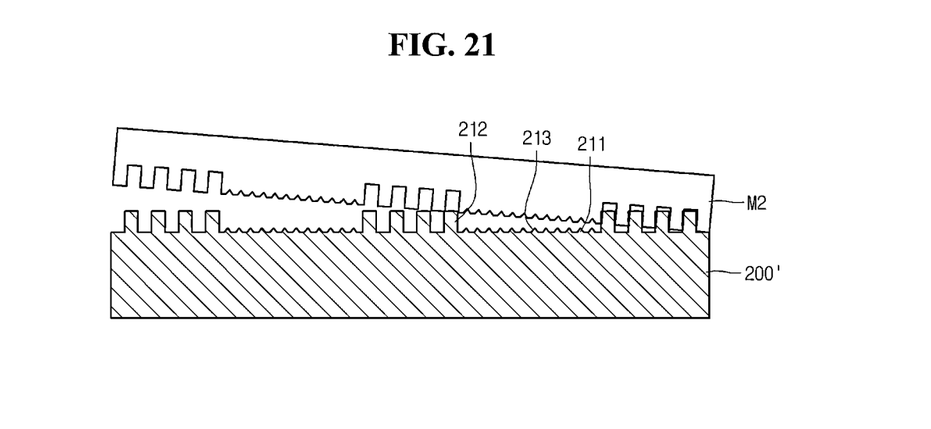

Meanwhile, as shown in FIGS. 20 and 21, the first sub-pattern 211, the second sub-pattern 212, and the third sub-pattern 213 may be formed through another mold M2.

Figure 22:
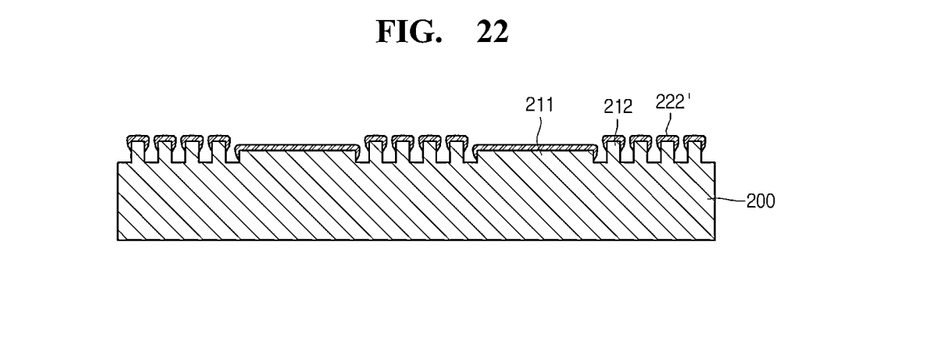

Thereafter, referring to FIG. 22, the electrode material 222' may be formed on the first and second sub-patterns 211 and 212. The electrode material 222' may be formed through a deposition scheme or a plating scheme.

Figure 23:
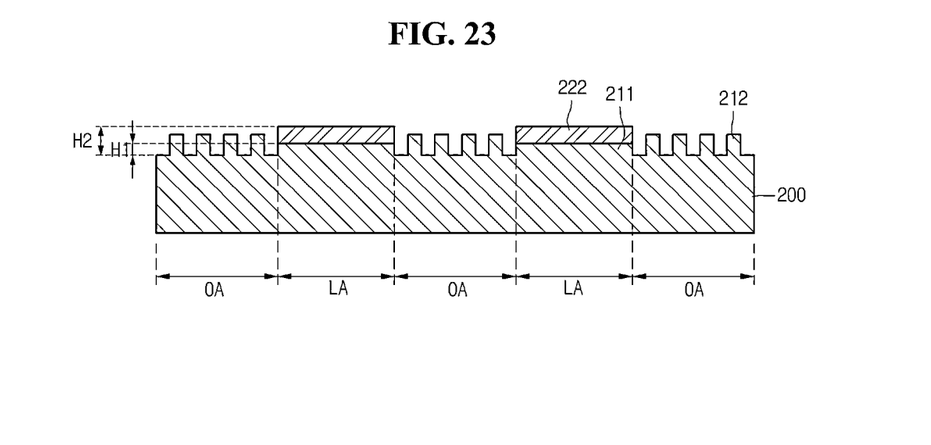

Referring to FIG. 23, the electrode material 222' may be etched. In this case, the difference in the etching areas is made depending on the difference between the structure of the first sub-pattern 211 and the structure of the second sub-pattern 212 and the difference in the contact area with the electrode materials 222' between the first sub-pattern 211 and the second sub-pattern 212. In other words, since the contact area between the first sub-pattern 211 and the electrode material 222' is greater than the contact area between the second sub-pattern 212 and the electrode material 222', the electrode material 222' formed on the first sub-pattern 211 may be less etched. In other words, at the same etching rate, the electrode materials 222' formed on the first sub-pattern 211 remains, and the electrode material 222' formed on the second sub-pattern 212 is etched and removed. Therefore, the electrode layer 222 may be formed only on the first sub-pattern 211, and may be provided in the shape of a mesh.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
a substrate; and
an electrode part on the substrate,
wherein the electrode part comprises:
a first sub-pattern;
an electrode layer on the first sub-pattern;
a second sub-pattern adjacent to the first sub-pattern; and
a third sub-pattern on a top surface of the first sub-pattern,
wherein the third sub-pattern comprises a plurality of protrusions,
wherein the electrode layer is provided on the third sub-pattern,
wherein the electrode layer is provided in a shape of a mesh,
wherein the third sub-pattern has a height lower than a height of the second sub-pattern; and
wherein the electrode layer includes Cu, Au, Ag, Al, Ti, Ni, or an alloy thereof.

2. The touch window of claim 1, wherein the third sub-pattern comprises a first central part and a first outer part outside the first central part,
the third sub-pattern comprises a mountain having a highest height, and
the mountain is provided only at one of the first central part and the first outer part.

3. The touch window of claim 2, wherein the mountain is provided in the first central part.

4. A touch window comprising:
a substrate; and
an electrode part on the substrate,
wherein the electrode part comprises:
a first sub-pattern;
an electrode layer on the first sub-pattern;
a second sub-pattern adjacent to the first sub-pattern; and
a third sub-pattern on a top surface of the first sub-pattern,
wherein the third sub-pattern comprises a first central part and a first outer part outside the first central part,
the third sub-pattern comprises a mountain having a highest height, and
the mountain is provided only at one of the first central part and the first outer part, and
wherein the mountain is provided in the first outer part.

5. The touch window of claim 1, wherein the third sub-pattern has an asymmetrical sectional surface.

6. A touch window comprising:
a substrate; and
an electrode part on the substrate,
wherein the electrode part comprises:
a first sub-pattern;
an electrode layer on the first sub-pattern;
a second sub-pattern adjacent to the first sub-pattern; and
a third sub-pattern on a top surface of the first sub-pattern,
wherein the first sub-pattern comprises a second central part and a second outer part outside the second central part, and
the third sub-pattern is provided only in one of the second central part and the second outer part.

7. The touch window of claim 6, wherein the third sub-pattern is provided in the second central part.

8. The touch window of claim 6, wherein the third sub-pattern is provided in the second outer part.

9. The touch window of claim 1, wherein the first sub-pattern has a height equal to or lower than a height of the second sub-pattern.

10. The touch window of claim 1, a top surface of the electrode layer is located lower than a top surface of the second sub-pattern.

11. The touch window of claim 1, wherein a top surface of the electrode layer has a height same as a height of a top surface of the second sub-pattern.

12. The touch window of claim 1, wherein the third sub-pattern includes a same material as that of the first sub-pattern.

13. The touch window of claim 1, wherein the first sub-pattern comprises a plurality of first forming units, and wherein the second sub-pattern is interposed between two of the first forming units.

14. The touch window of claim 1, wherein the second sub-pattern comprises a plurality of second forming units, and wherein the third sub-pattern is interposed between two of the second forming units.

15. The touch window of claim 2, wherein the mountain has a height lower than a height of the second sub-pattern.

16. The touch window of claim 6,
wherein the third sub-pattern has a height lower than a height of the second sub-pattern, and
wherein the electrode layer has a height larger than the height of the second sub-pattern.

17. The touch window of claim 1, wherein the first sub-patterns and the second sub-patterns each includes resin or polymer.

* * * * *